United States Patent
Dai

(10) Patent No.: US 8,116,634 B2
(45) Date of Patent: Feb. 14, 2012

(54) ADAPTIVE INJECTION CURRENT CONTROLLED BURST MODE SOA FOR LONG AND WIDE REACH HIGH SPEED PON

(75) Inventor: Yuxin Dai, Santa Rosa, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1000 days.

(21) Appl. No.: 12/046,294

(22) Filed: Mar. 11, 2008

(65) Prior Publication Data

US 2009/0232501 A1   Sep. 17, 2009

(51) Int. Cl.
*H04B 10/00* (2006.01)
*H04B 10/06* (2006.01)

(52) U.S. Cl. .................................... 398/175; 398/210

(58) Field of Classification Search .................. 398/175, 398/201
See application file for complete search history.

(56) References Cited

U.S. PATENT DOCUMENTS

| | | | |
|---|---|---|---|
| 2002/0163694 A1* | 11/2002 | Mears et al. | 359/130 |
| 2004/0233515 A1 | 11/2004 | Yun et al. | |
| 2004/0247246 A1* | 12/2004 | Lee et al. | 385/48 |
| 2005/0041971 A1* | 2/2005 | Lee et al. | 398/72 |
| 2006/0268398 A1* | 11/2006 | Cole et al. | 359/344 |

OTHER PUBLICATIONS

Talli et al. Feasibility Demonstration of 100km Reach DWDM SuperPON with Upstream Bit Rates of 2.5Gb/s and 10Gb/s. OSA/OFC 2005, [retrieved on Mar. 2, 2011]. Retrieved from the Internet <URL:www.opticsinfobase.org/viewmedia.cfm?uri=OFC-2005-OFI1&seq=0.*

Shea et al.; Long-Reach Optical Access Technologies; IEEE Network, Sep./Oct. 2007 [online], [retrieved on Aug. 8, 2011]. Retrieved from the Internet <URL:http://www.idc-online.com/technical_references/pdfs/data_communications/Long%20Reach%20Optical%20Access%20Technologies.pdf>.*

* cited by examiner

*Primary Examiner* — Nathan Curs
(74) *Attorney, Agent, or Firm* — Conley Rose, P.C.; Grant Rodolph

(57) ABSTRACT

An apparatus comprising an optical power splitter, an optical delay line coupled to the optical power splitter, an optical amplifier (OA) coupled to the optical delay line, and an adaptive injection current (AIC) controller coupled to the optical power splitter and the OA. Also disclosed is an apparatus comprising at least one component configured to implement a method comprising converting an optical signal into a voltage signal, calculating an amplitude correction value for the voltage signal, inverting an amplitude of the voltage signal, adjusting the amplitude of the inverted voltage signal according to the amplitude correction value, and converting the adjusted voltage signal into a current signal. Included is a network comprising an optical line terminal (OLT) comprising an optical receiver and an AIC controlled OA coupled to the optical receiver, wherein the AIC controlled OA provides optical power equalization for any upstream optical signals.

12 Claims, 10 Drawing Sheets

ADAPTIVE INJECTION CURRENT CONTROLLED BURST MODE SOA FOR LONG AND WIDE REACH HIGH SPEED PON

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In current PON systems, the downstream data is broadcasted with no or infrequent interruptions from the OLT to the ONUs in the form of about continuous optical wave signals. On the other hand, the upstream data is transmitted from the ONUs to the OLT with more frequent interruptions or pauses in the form of optical burst signals. The optical burst signals' amplitudes can vary from one optical burst signal to another. As a result of the frequent pauses and the variations in the individual optical burst signals amplitudes, the average amplitude in the optical burst signals can fluctuate over time that results in DC voltage offset variation in the optical receiver. The varying DC offset can increase the time required by the optical receivers to adjust the decision threshold and distinguish between the individual "0" and "1" symbols, referred as level recovery. The excessive time required for level recovery in the optical receivers can reduce the optical receivers' detection capabilities as the optical burst signal rates increase, for example, from about 1.25 Gigabits per second (Gbps) to about 2.5 Gbps and about 10 Gbps.

An 8b10b code can be implemented to relax the optical receiver's time requirements, where eight-bit blocks of random data can be converted into ten-bit blocks of restricted code. However, the 8b10b code adds about a 25 percent bandwidth overhead. Alternatively, optical power equalization methods can be implemented using optical amplifiers (OAs), such as gain clamped Semiconductor OAs (SOAs), to smooth the optical burst signal to some degrees thus to reduce the DC offset variations in the optical receiver. The SOAs can also amplify the optical burst signals and compensate for transmission losses, which may result due to signal splitting in the ODN, signal attenuation over long travel distances, or both. However, optical power equalization using optical injection to the SOAs or using inversed input signal directly superposed on the bias current of SOAs becomes less efficient when the burst amplitude difference in the optical burst signals increase.

SUMMARY

In one embodiment, the disclosure includes an apparatus comprising an optical power splitter, an optical delay line coupled to the optical power splitter, an OA coupled to the optical delay line, and an adaptive injection current (AIC) controller coupled to the optical power splitter and the OA.

In another embodiment, the disclosure includes an apparatus comprising at least one component configured to implement a method comprising converting an optical signal into a voltage signal, calculating an amplitude correction value for the voltage signal, inverting an amplitude of the voltage signal, adjusting the amplitude of the inverted voltage signal according to the amplitude correction value, and converting the adjusted voltage signal into a current signal.

In yet another embodiment, the disclosure includes a network comprising an OLT comprising an optical receiver and an AIC controlled OA coupled to the optical receiver, wherein the AIC controlled OA provides optical power equalization for any upstream optical signals.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their fill scope of equivalents.

Disclosed herein is an apparatus and method for implementing adaptive optical power equalization using OAs to smooth the optical burst signal therefore to eliminate or reduce DC offset variations in the optical receiver. The OAs may be SOAs that may be injected with current control signals in an adaptive manner to amplify and forward the optical burst signals at about equal power. The injected current control signals may be obtained by tapping into the transmitted optical burst signals, converting a portion of the optical burst signals into electrical signals, adaptively reshaping the electrical signals, and converting the reshaped electrical signals into current control signals. An electrical signal may be adaptively reshaped by comparing the amplitude of the electrical signal to the amplitudes of previous electrical signals corresponding to previous optical burst signals, and adjusting the amplitude accordingly. The apparatus may be implemented to boost the transmitted optical signals along a PON, to receive the signals at about 10 Gbps rates using standard optical receivers in the PON, and to transmit and receive the signals over long distances and in PONs comprising many ONUs.

Figure 1:
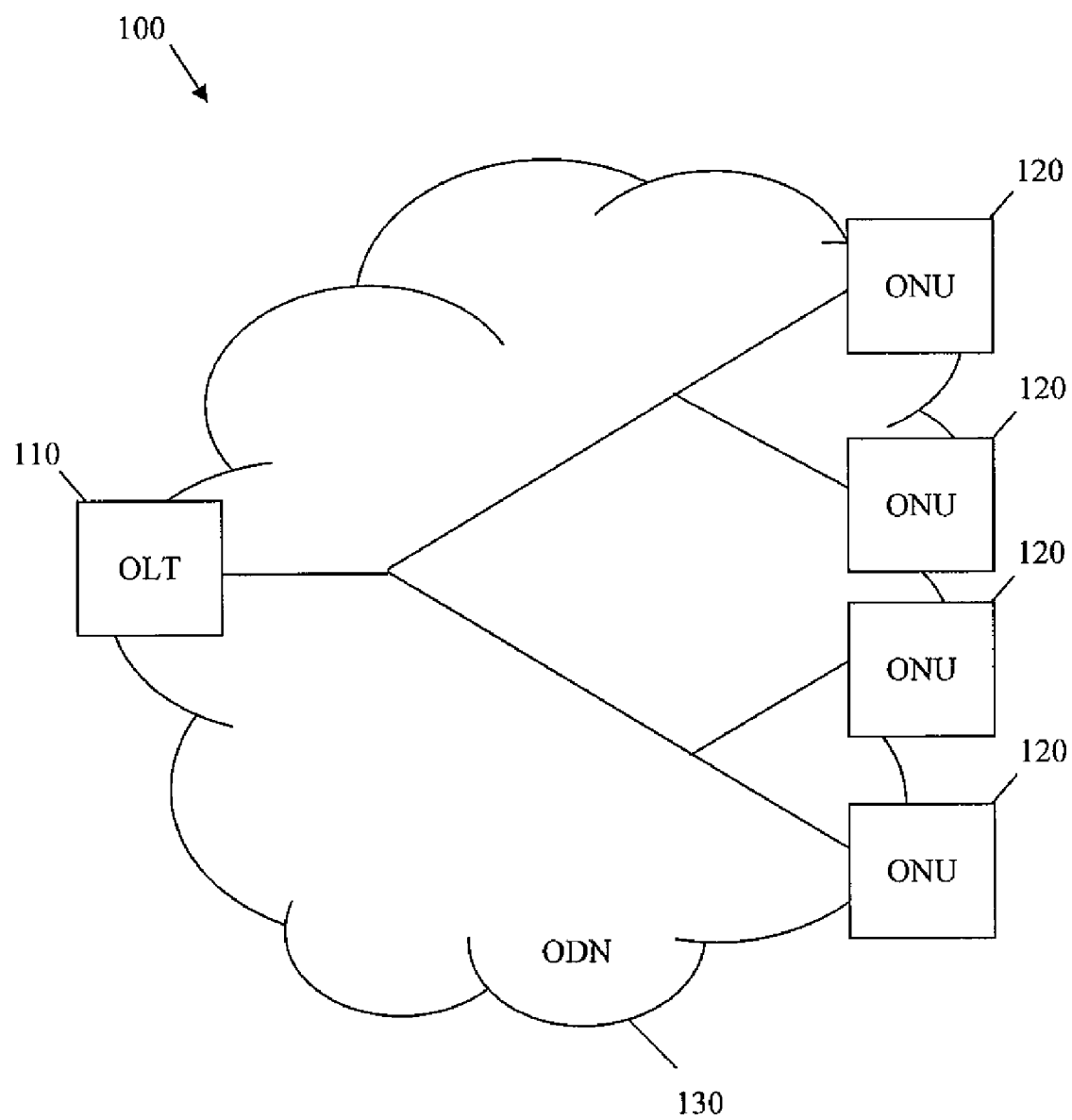
FIG. 1 is a schematic diagram of an embodiment of a PON.

FIG. 1 illustrates one embodiment of a PON 100. The PON 100 comprises an OLT 110, a plurality of ONUs 120, and an ODN 130. The PON 100 is a communications network that does not require any active components to distribute data between the OLT 110 and the ONUs 120. Instead, the PON 100 uses the passive optical components in the ODN 130 to distribute data between the OLT 110 and the ONUs 120. Examples of suitable PONs 100 include the asynchronous transfer mode PON (APON) and the broadband PON (BPON) defined by the ITU-T G.983 standard, the Gigabit PON (OPON) defined by the ITU-T G.984 standard, the Ethernet PON (EPON) defined by the IEEE 802.3ah standard, 10 Gbps PON, and the wavelength division multiplexing PON (WPON), all of which are incorporated by reference as if reproduced in their entirety.

One component of the PON 100 may be the OLT 110. The OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver, as explained in detail below. When the other network is using a protocol, such as Ethernet or SONET/SDH, that is different from the communications protocol used in the PON 100, the OLT 110 may comprise a converter that converts the other network's data into the PON's protocol. The OLT 110 converter may also convert the PON's data into the other network's protocol. The OLT 110 described herein is typically located at a central location, such as a central office, but may be located at other locations as well.

Another component of the PON 100 may be the ONUs 120. The ONUs 120 may be any devices that are configured to communicate with the OLT 110 and a customer or user (not shown). Specifically, the ONUs may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110. Additionally, the ONUs 120 may comprise an optical receiver configured to receive optical signals from the OLT 110 and a converter that converts the optical signal into electrical signals for the customer, such as signals in the Asynchronous Transfer Mode (ATM) or Ethernet protocol. The ONUs 120 may also comprise a second transmitter and/or receiver that may send and/or receive the electrical signals to a customer device. In some embodiments, ONUs 120 and optical network terminals (ONTs) are similar, and thus the terms are used interchangeably herein. The ONUs are typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 120. The ODN 130 typically extends from the OLT 110 to the ONUs 120 in a branching configuration as shown in FIG. 1, but may be alternatively configured in any other configuration.

Figure 2:
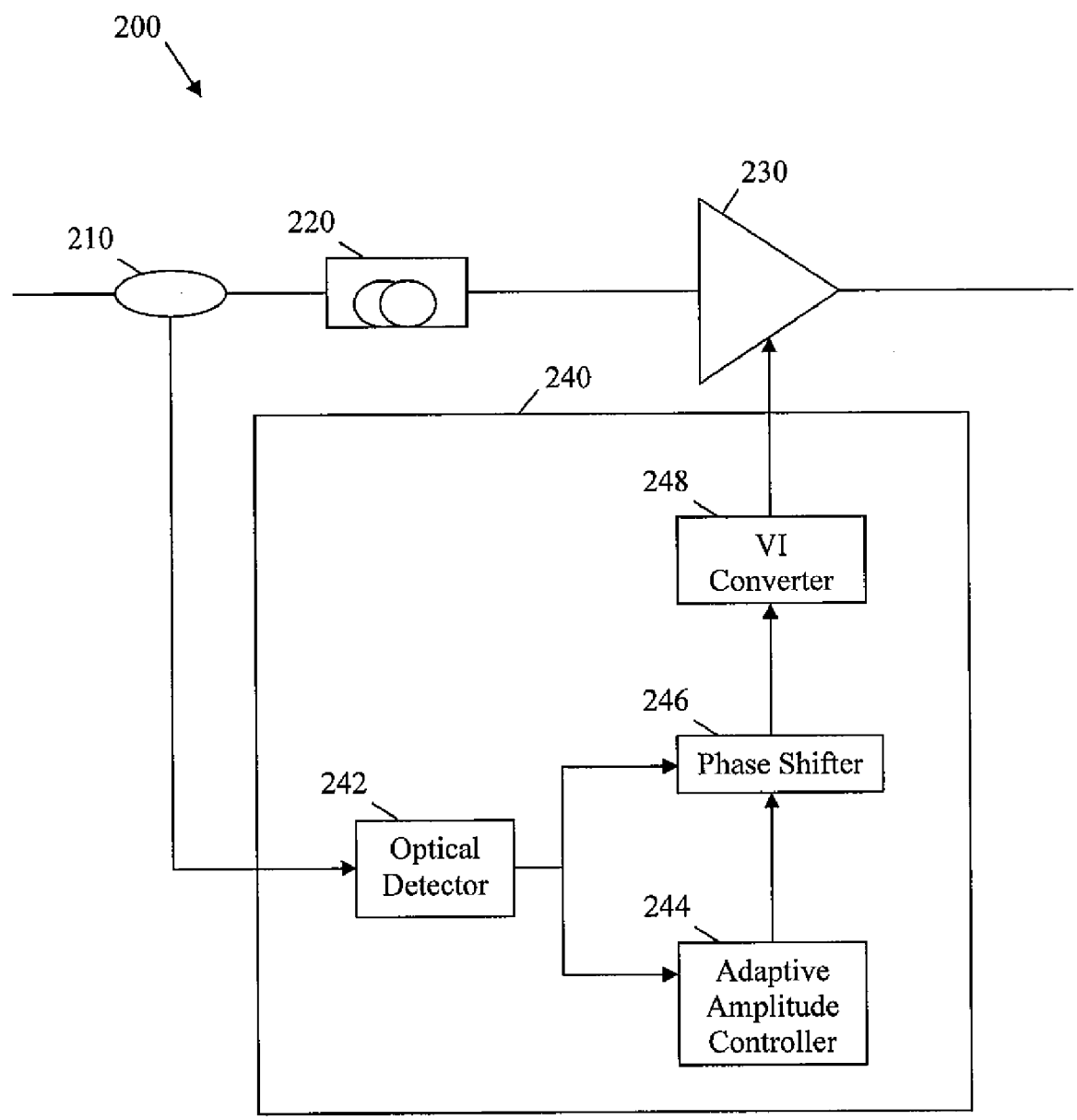
FIG. 2 is a schematic diagram of an embodiment of an adaptive injection current controlled OA.

FIG. 2 illustrates an embodiment of an AIC controlled OA 200, which may be coupled to the OLT 110 or the ODN 130 in the PON 100. The AIC controlled OA 200 may be used to eliminate or reduce the burst amplitude difference in the optical burst signals hence reduce the DC offset variations in the optical receiver. The AIC controlled OA 200 may also be used to compensate for signal attenuations and losses by boosting optical signal strength. The AIC controlled OA 200 may comprise an optical power splitter 210, an optical delay line (ODL) 220, an OA 230, and an AIC controller 240.

The optical power splitter 210 may be any device such as a fused-biconic-taper (FBT) or planar-lightwave-circuit (PLC) that may be used to split an incoming light beam into a plurality of light beams. The optical power splitter 210 may receive optical signals and split the optical signals into two copies. The optical power splitter 210 may be coupled to the ODL 220 and may forward a first copy of the optical signals to the ODL 220. The optical power splitter 210 may also be coupled to the AIC controller 240 and may forward a second copy of the optical signals to the AIC controller 240. The two copies may have a total power that may be about equal to the power of the received optical signals. The power of the first copy may also be larger than that of the second copy.

The ODL 220 may be coupled to the OA 230 in addition to the optical power splitter 210. The ODL 220 may receive the first copy of the optical signal from the optical power splitter 210, delay the travel time of the first copy, and forward the first copy to the OA 230. Specifically, the ODL 220 may comprise input and output optical collimators separated by some adjustable space distance. The input collimator may receive the first copy in the fiber coupled to the ODL 220 and send the first copy through the space between the input and output collimators and to the output collimator. The output collimator may receive the first copy and send the first copy to the fiber coupled to the OA 230. The travel delay time of the first copy between the input and output collimators may be increased or decreased by increasing or decreasing, respectively, the space distance between the input and output collimators. The ODL 220 may also comprise a spool of optical fiber of certain lengths that are determined by the required value of delay time.

The OA 230 may be any optical amplifier, such as an optical amplifier comprising a semiconductor gain medium with anti-reflection elements at two opposite edge surfaces. The semiconductor gain medium may be pumped or injected electrically using current signals to amplify the optical signals inside the OA 230. The optical signal may also be amplified proportionally to the injection current signals if the OA is operated in the linear region. The OA 230 may be coupled to the AIC controller 240 and may receive the injection current signals from the AIC controller 240. Specifically, the OA 230 may receive the first copy of the optical signals from the ODL 220 at one input and injection currents from the AIC controller 240 at another input. The OA 230 may amplify the power of the optical signals proportionally to the amplitude of the injection currents and forward the amplified optical signal downstream.

The AIC controller 240 may receive the second copy of the optical signals from the optical power splitter 210 and adaptively convert the optical signals into the injection currents, which may then be injected into the OA 230. The injection currents may be controlled to amplify the first copy of optical burst signals in the OA 230 at about equal power and with no or reduced DC offset variations when detected with an optical receiver. Specifically, the AIC controller 240 may send the injection currents to the OA 230 at about the same arrival time as the first copy of optical signals, which may be delayed by the ODL 220. The delay time may be about equal to the time required by the AIC controller 240 to convert the second copy of the optical signals into the injection currents. The AIC controller 240 may comprise an optical detector 242, an adaptive amplitude controller (AAC) 244, a phase shifter 246, and a voltage-to-current (VI) converter 248.

The optical detector 242 may receive the second copy of the optical signal and convert the second copy into electrical voltage signals. For example, the optical detector 242 may be a positive intrinsic negative (PIN) diode, which may comprise an intrinsic semiconductor region in addition to a plurality of other types of semiconductor regions. The PIN diode may be reverse biased using some external electrical bias signal to trap some of the optical signals' energies, or photons, passing through the intrinsic region. The trapped optical signals' energies may be hence collected in the form of electrical voltage signals' energies.

The AAC 244 may be coupled to the optical detector 242 and may receive from the optical detector 242 a first copy of the collected voltage signals. Specifically, the AAC may store the amplitude of each consecutive voltage signal and update an average amplitude for the collected voltage signals. The AAC 244 may also compare the amplitude of each consecutive voltage signal with those of preceding voltage signals and update a largest amplitude value and a smallest amplitude value for the collected voltage signals. The AAC 244 may calculate a correction value for each voltage signal, which may be equal to about the product of a constant and the difference between the stored amplitude of the voltage signal and the updated average amplitude. The correction values may be used, as described below, to adjust the amplitudes of the voltage signals. The constant may be determined experimentally to allow equalizing of the input burst optical signals to the SOA with as much amplitude difference as possible into optical signals output from the SOA with about equal optical amplitudes. For example, a plurality of constants may be used to calculate a plurality of correction values. Of those constants, the constant that results in substantial amplitude equalization of optical signals with largest amplitude difference may be selected. The decision for selecting the experimental constant may be partially influenced based on the updated maximum and minimum amplitude values. For example, the maximum amplitude value, minimum amplitude value, or both may be used to calculate a modified constant that may be about equal or slightly different than the experimental constant.

The phase shifter 246 may be coupled to the optical detector 242 and the AAC 244. The phase shifter 246 may receive a second copy of the collected voltage signals and the corresponding correction values from the optical detector 242 and the AAC 244, respectively. The phase shifter 246 may invert the voltage signals by introducing a phase shift in the voltage signals, for example at about 180°. The phase shifted voltage signal may have an opposite sign than that of the corresponding voltage signal. In other words, when the voltage signal is positive, the phase shifted voltage signal may be negative, and vice-versa. The phase shifted voltage may have an absolute amplitude about equal to that of the voltage signal. Additionally, the phase shifter 246 may adjust the absolute amplitudes of the voltage signals by adding the corresponding correction values. For instance, the absolute voltage amplitude may be decreased by an amount equal to the absolute correction value when the absolute value of the voltage amplitude is smaller than the absolute value of the average voltage amplitude so that the corresponding input optical burst experiences more amplification in the OA. On the other hand, the absolute amplitude may be increased by the amount equal to the absolute correction value when the absolute voltage amplitude is larger than the absolute average amplitude so that the corresponding input optical burst experiences less amplification in the OA. Consequently, the absolute voltage amplitudes may be about equal to the absolute average amplitude and about equal to each other.

The VI converter 248 may be coupled to the phase shifter 246 and the OA 230. The VI converter 248 may receive from the phase shifter 246 the inverted voltage signals. The VI converter 248 may convert the voltage signals into current signals of proportional amplitudes. Subsequently, the current signals may have adaptive amplitude correction build in and may be injected into the OA 240 to achieve maximum optical power equalization. The injection current signals may arrive at the OA 230 at about the same time as the first copy of optical signals, which may be delayed by the ODL 220 for an amount of time. The amount of delay time may be about equal to the amount of time required by the AIC controller 240 to convert the second copy of the optical signals into the injection current signals. The VI converter 248 may also be a high speed VI converter that converts voltage signals corresponding to optical burst signals of relatively high frequencies into high frequency current signals.

In other embodiments, the AIC controlled OA 200 may additionally be used to equalize or partially equalize the power of other optical signals that may not be optical burst signals including signals that may be transmitted upstream and downstream. In some embodiments, the OA 230 may be substituted by another type of OA that may be controlled directly or indirectly using injection current signals. For instance, the current signals may be used to control a pump laser that may be coupled to an OA, such as an Erbium doped fiber amplifier (EDFA) or a Raman amplifier. The amplitudes of the pump laser output signals may be proportional to the current signals amplitudes and may be used to control the OA optical signal amplification.

Figure 3:
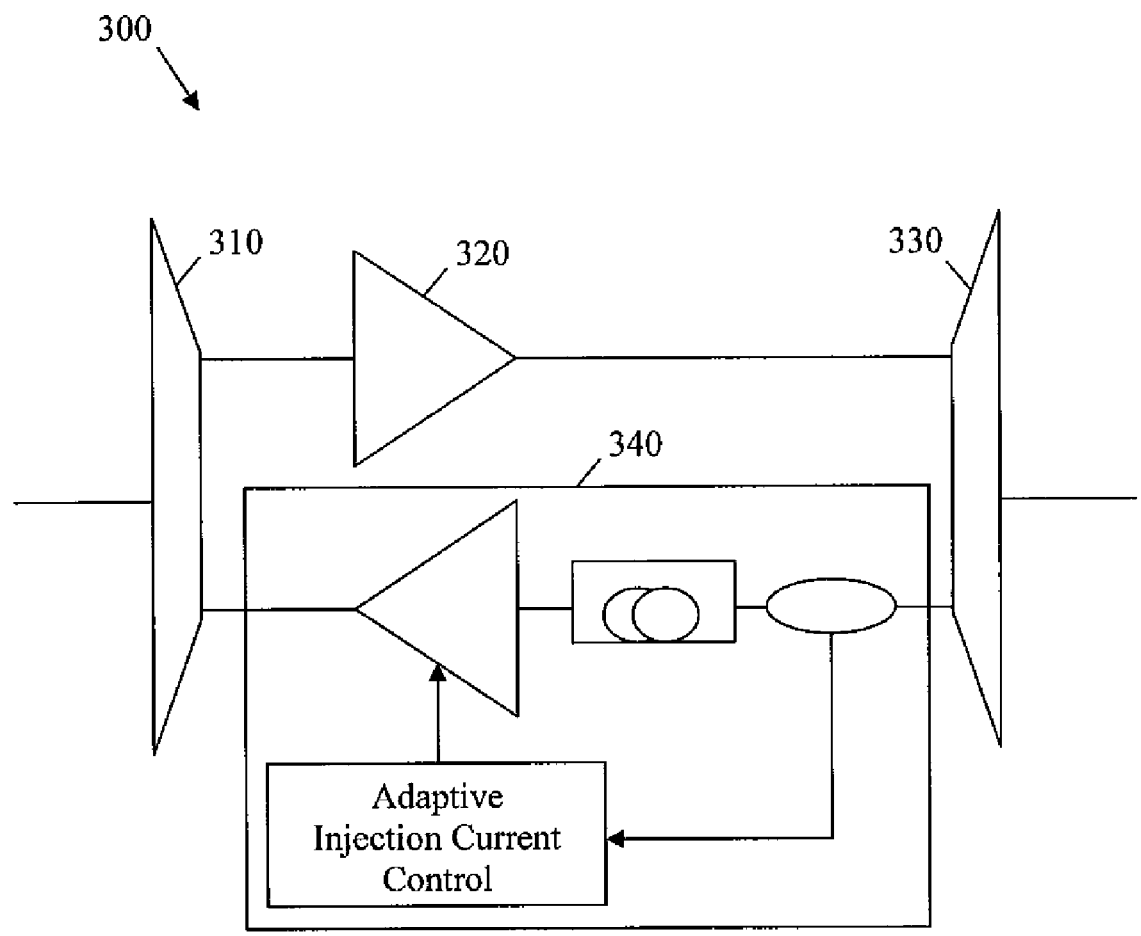
FIG. 3 is a schematic diagram of an embodiment of an optical booster.

FIG. 3 illustrates an embodiment of an optical booster 300 that may comprise an AIC controlled OA similar to the AIC controlled OA 200. The optical booster 300 may be coupled to the OLT 110 or the ODN 130 in the PON 100 and may be used to eliminate or reduce DC offset variations in the optical receiver and thus improve optical signals' reception in the PON 100. The optical booster 300 may also be used to compensate for signal losses in long-reach PON systems with relatively long distances along the ODN and in wide-reach PON systems comprising relatively large numbers of ONUs. The optical booster 300 may comprise a first wavelength division multiplexer (WDM) 310, an OA 320, a second WDM 330, and an AIC controlled OA 340.

The first WDM 310 may be coupled to the OA 320 and the AIC controlled OA 340. The first WDM 310 may route the optical signals downstream from the OLT 110 to the OA 320 at a first wavelength or wavelength channel. The first WDM 310 may also forward upstream the optical signals at a second wavelength or wavelength channel from the AIC controlled OA 340. For instance, the first WDM 310 may be an optical filter that may separate the optical signals transmitted downstream at a first wavelength equal to about 1490 nanometers (nm) from the optical signals transmitted upstream at a second wavelength equal to about 1310 nm.

The OA 320 may receive the optical signals transmitted downstream at the first wavelength or wavelength channel, amplify each optical signal power proportionally with or without power equalization, and forward the optical signals downstream. As such, the OA 320 may be any of the OAs described herein. In addition, the OA 320 may be configured to amplify optical signals transmitted over the C-band channel comprising wavelengths between about 1530 nm to about 1565 nm or the S-band channel comprising wavelengths between about 1460 nm to about 1530 nm.

The second WDM 330 may be coupled to the OA 320 and may be configured to forward the optical signals transmitted downstream at the first wavelength or wavelength channel from the OA 320. The second WDM 330 may also be coupled to the AIC controlled OA 340 and may be configured to forward the optical signals transmitted upstream at the second wavelength or wavelength channel to the AIC controlled OA 340. The second WDM 330 may be an optical filter configured similar to the second WDM 310 and may separate the optical signals transmitted at about 1490 nm from the optical signals transmitted at about 1310 nm.

The AIC controlled OA 340 may receive the optical signals transmitted upstream at the second wavelength or wavelength channel, which may include optical burst signals. The AIC controlled OA 340 may be similar to the AIC controlled OA described above, and thus may adaptively amplify the optical signals at about equal power and forward the amplified optical signals upstream. The OA 340 may be configured to amplify optical signals transmitted over the O-band comprising wavelengths between about 1260 nm to about 1360 nm.

Figure 4:
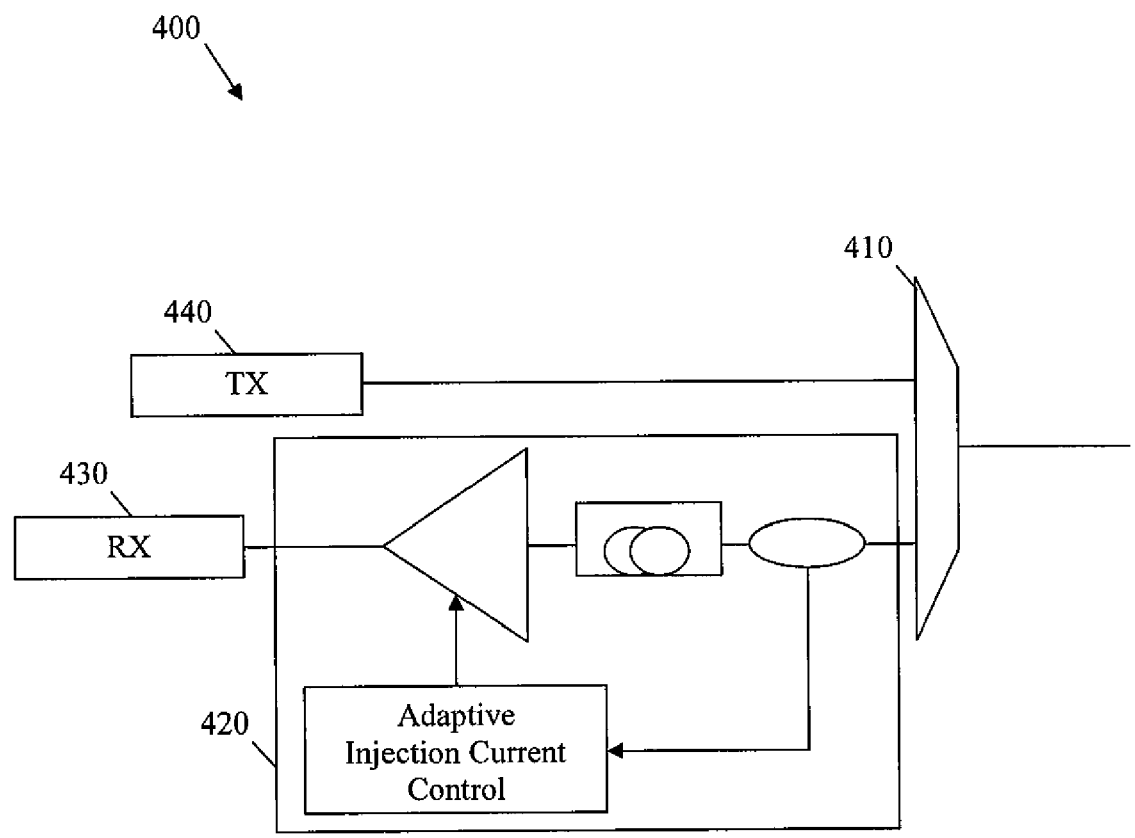
FIG. 4 is a schematic diagram of an embodiment of an integrated optical receiver.

FIG. 4 illustrates an embodiment of an integrated optical receiver and transmitter system 400 in OLT 110 that may comprise an AIC controlled OA similar to the AIC controlled OA 200 as a pre-amplifier. The integrated system 400 may be coupled to the OLT 110 to improve upstream optical signals reception in the PON 100. By improving reception for upstream signals, the integrated system 400 may facilitate symmetric bidirectional communications at high data rate such as 10 Gbps, where the transmission bandwidth for upstream signals may match or approach the bandwidth for downstream signals. The integrated system 400 may comprise a WDM 410, an AIC controlled OA 420, an optical receiver 430, and an optical transmitter 440.

The WDM 410 may be coupled to the AIC controlled OA 420 and the optical transmitter 440. The WDM 410 may route downstream the optical signals transmitted downstream from the optical transmitter 440 at a first wavelength (1490 nm) or wavelength channel, and route the optical signals transmitted upstream from the ONUs 120 to the AIC controlled OA 420 at a second wavelength (1310 nm) or wavelength channel. For example, the WDM 410 may be an optical filter that may separate the optical signals transmitted upstream at about 1310 nm from the optical signals transmitted downstream at about 1490 nm. The AIC controlled OA 420 may receive the optical signals transmitted upstream at the second wavelength or wavelength channel, which may include optical burst signals. The AIC controlled OA 420 may adaptively amplify the optical signals at about equal power and send the amplified optical signals to the optical receiver 430.

In one embodiment, the optical receiver 430 and the optical transmitter 440 may receive and transmit, respectively, the optical signals at different bandwidths and different wavelengths or wavelength channels. In another embodiment, the optical receiver 430 and the optical transmitter 440 may receive and transmit, respectively, the optical signals at about equal bandwidths. For instance, the optical receiver 430 may receive the amplified optical burst signals from the AIC controlled OA 420 at about 10 Gbps and a wavelength of about 1310 nm. Similarly, the optical transmitter 440 may transmit optical signals downstream at about 10 Gbps but at a wavelength of about 1490 nm. In an embodiment, the optical transmitter 440 may transmit optical signals at about 5 decibels per milliwatt (dBm), such as a distributed feedback (DFB) laser.

Figure 5:
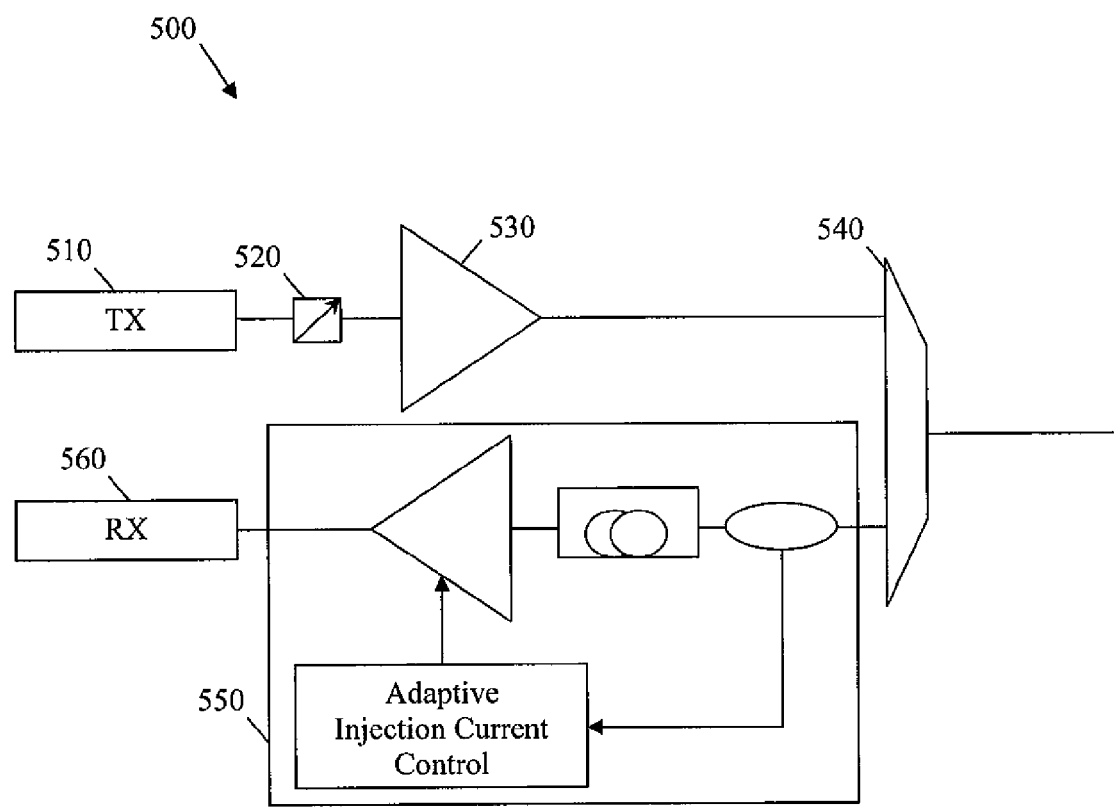
FIG. 5 is a schematic diagram of an embodiment of a long & wide-reach OLT.

FIG. 5 illustrates an embodiment of an OLT 500 that may be used in wide-reach PON systems comprising up to about 256 ONUs. The OLT 500 may communicate with the ONUs by transmitting and receiving optical signals using two different downstream and upstream channels, respectively. The OLT 500 may comprise an optical transmitter 510, an optical attenuator 520, an OA 530, a WDM 540, an AIC controlled OA 550, and an optical receiver 560. In an embodiment, the optical transmitter 510, which may be like any of the optical transmitters described herein, may transmit the optical signals downstream at about 10 Gbps and over the C-band channel. The optical attenuator 520 may be coupled to the optical transmitter 510 and may be an absorptive, reflective, or another type of attenuator. The optical attenuator 520 may reduce the optical signals' power prior to sending the optical signals to the OA 530, which may be necessary to prevent saturation at the OA 530. Otherwise, excessive power levels in the optical signals may saturate the OA 530 and prevent proper signal amplification. The OA 530, which may be like any of the OAs described herein, may receive the attenuated optical signals from the optical attenuator 520, amplify the attenuated optical signals and forward the optical signals to the WDM 540. The WDM 540 may receive the amplified optical signals and route the signals downstream to the ONUs. Amplifying the optical signals using the OA 530 may compensate for reduced powers in the signals received at the ONUs due to signal splitting along the branches of the ODN.

The WDM 540 may also receive optical signals, including optical burst signals, from the ONUs at a wavelength of about 1310 nm and forward the signals to the AIC controlled OA 550. The AIC controlled OA 550 may adaptively amplify the optical signals and forward the signals to the optical receiver 560 over the O-band channel. The optical receiver 560 may hence receive the optical signals with about equal amplitude, which may reduce the DC offset in the optical receiver and enable upstream signal detection at similar rates as in downstream signals and up to about 10 Gbps.

Figure 6:
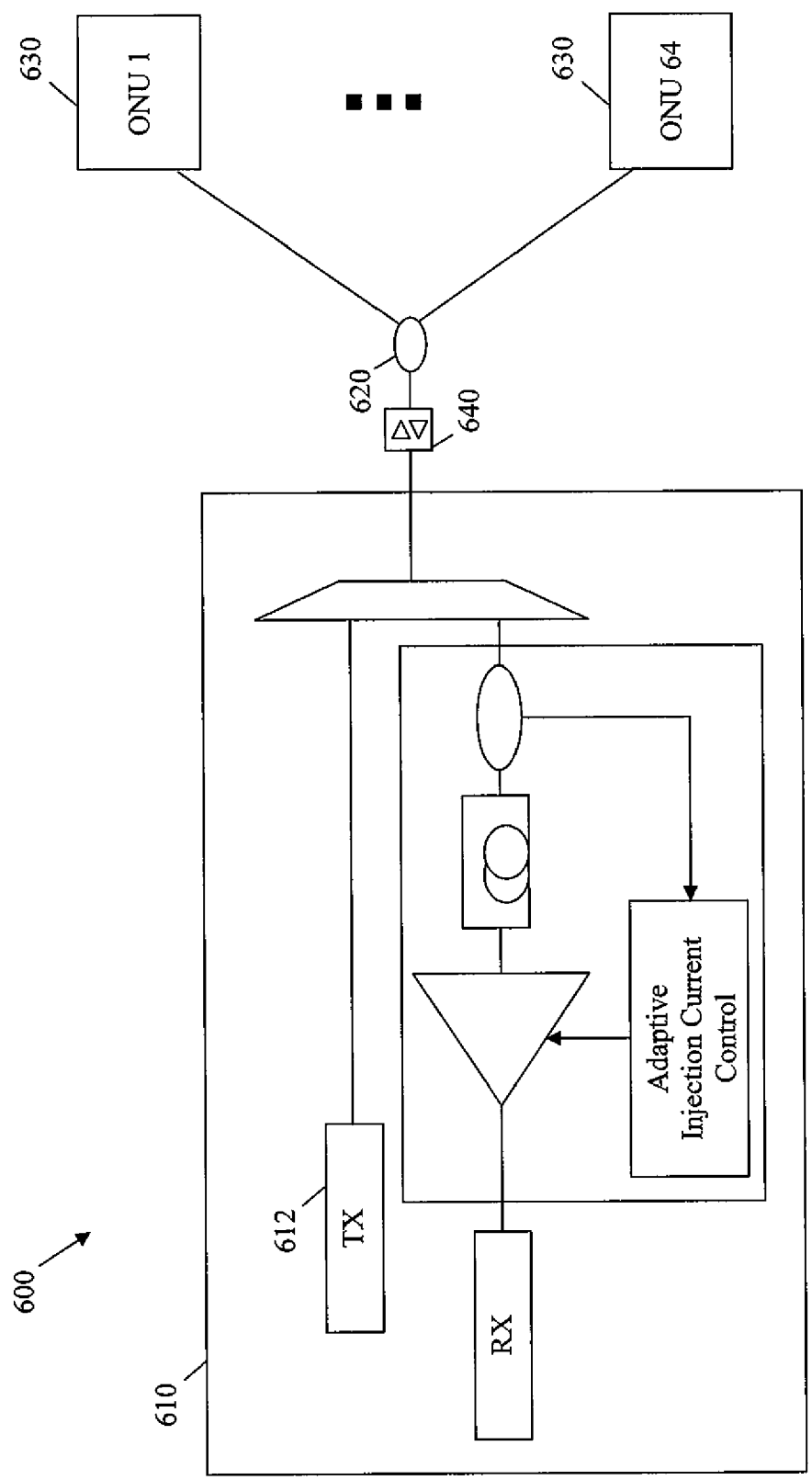
FIG. 6 is a schematic diagram of an embodiment of a long & wide-reach PON.

FIG. 6 illustrates an embodiment of a wide-reach PON 600. The PON 600 may comprise an OLT 610, a splitter 620, and up to about 64 ONUs 630. The OLT 610 may comprise an integrated optical receiver and transmitter system, similar to the integrated system 400. Hence, the OLT 610 may transmit and receive downstream and upstream signals, respectively, at about equal bandwidths, for example at 10 Gbps. The OLT 610 may also comprise an optical transmitter 612 that may be like any of the optical transmitters described herein. The optical transmitter 612 may transmit the optical signals downstream with sufficient power and without further signal amplification to compensate for power losses due to splitting at the splitter 620. The splitter 620 may receive the optical signals from the OLT 610, split the signals into a plurality of copies, and forward each copy downstream to one of the ONUs 630. Each ONUS 630 may receive a copy of the optical signals comprising a portion of the power of the original optical signals. The splitter 620 may also forward upstream signals, including optical burst signals, from each of the ONUs 630 to the OLT 610.

In some embodiments, the PON 600 may be a long and wide-reach PON with over about 60 km of fibers along the ODN. The PON 600 may comprise an optical booster 640, similar to the optical booster 300, which may be located between the OLT 610 and the splitter 620 or at any other location in the ODN. The optical booster 640 may further amplify the signals transmitted downstream prior to splitting the signals into a plurality of copies and forwarding the signals to the ONUs 630. Further amplifying the signals may compensate for additional power losses due to signal attenuations over long travel distances in the fibers. The optical booster may also adaptively amplify the optical burst signals transmitted upstream from the ONUs 630 before forwarding the signals to the OLT 610. The PON 600 may comprise additional optical boosters to compensate for additional losses introduced by longer length of fibers.

Figure 7:
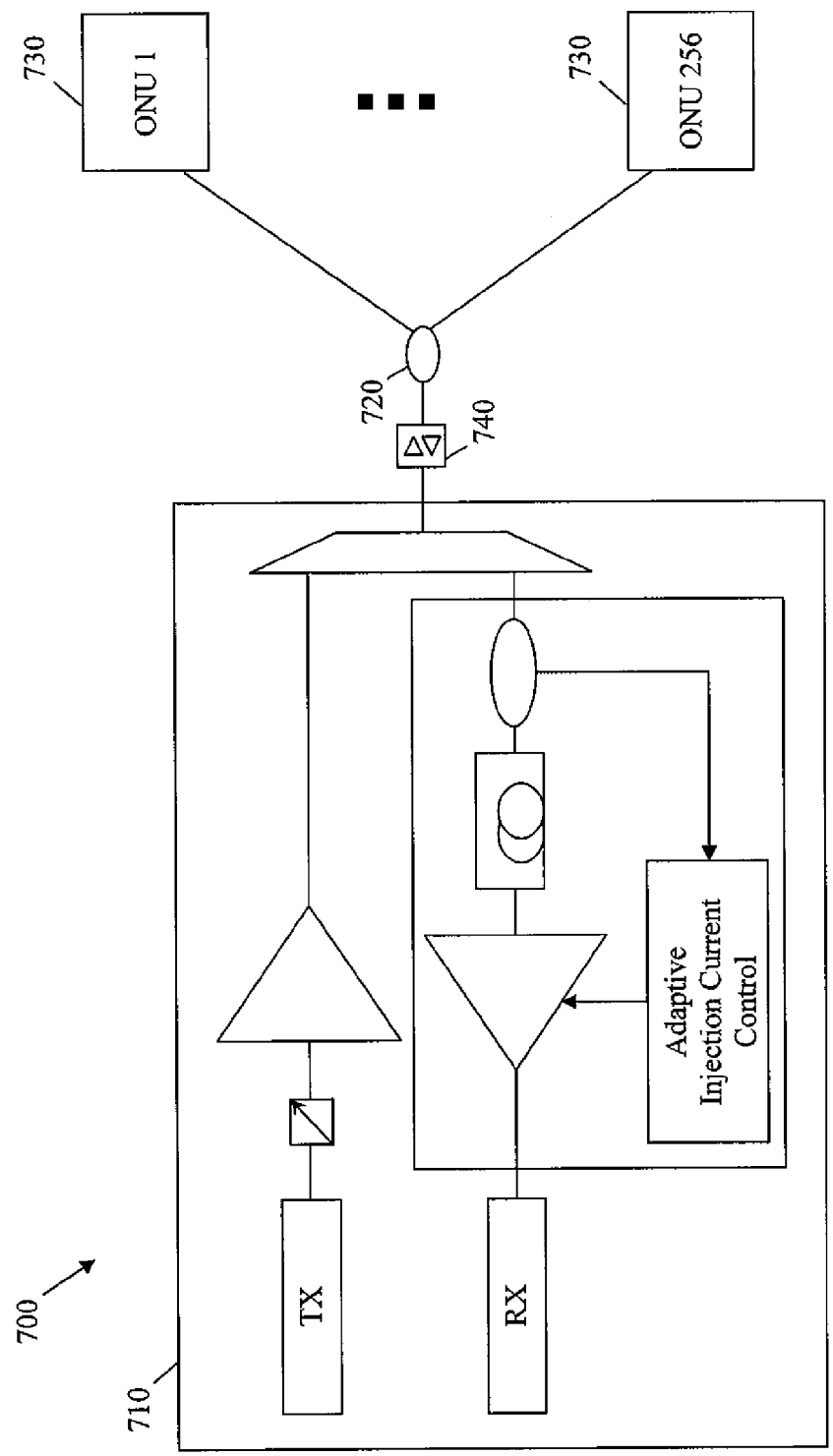
FIG. 7 is a schematic diagram of another embodiment of a long & wide-reach PON.

FIG. 7 illustrates another embodiment of a long & wide-reach PON 700. The PON 700 may comprise an OLT 710, a splitter 720, up to about 256 ONUs 730, and at least one optical booster 740 to extend the reach to about 60 km of fiber. The OLT 710 may be a wide-reach OLT similar to the OLT 500 and capable of transmitting and receiving downstream and upstream signals, respectively, at about equal bandwidths, such as at 10 Gbps. The OLT 710 may transmit the downstream signals with sufficient power to compensate for power reductions in the copies forwarded to each of the 256 ONUs 730. The PON 700 may also comprise additional optical boosters 740 for longer length of fibers.

Figure 8:
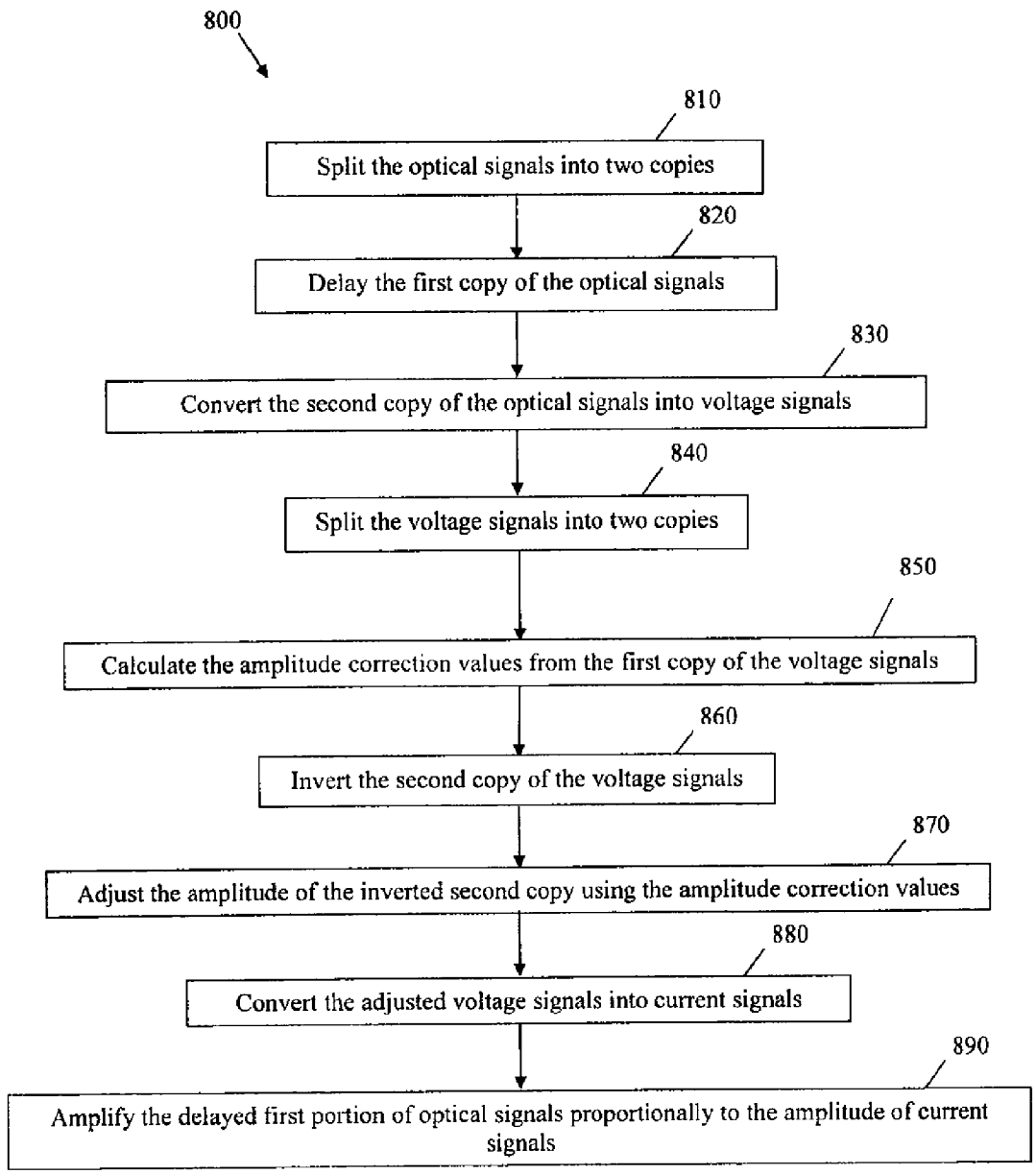
FIG. 8 is a flowchart of an embodiment of an adaptive injection current controlled optical burst mode method.
Figure 9:
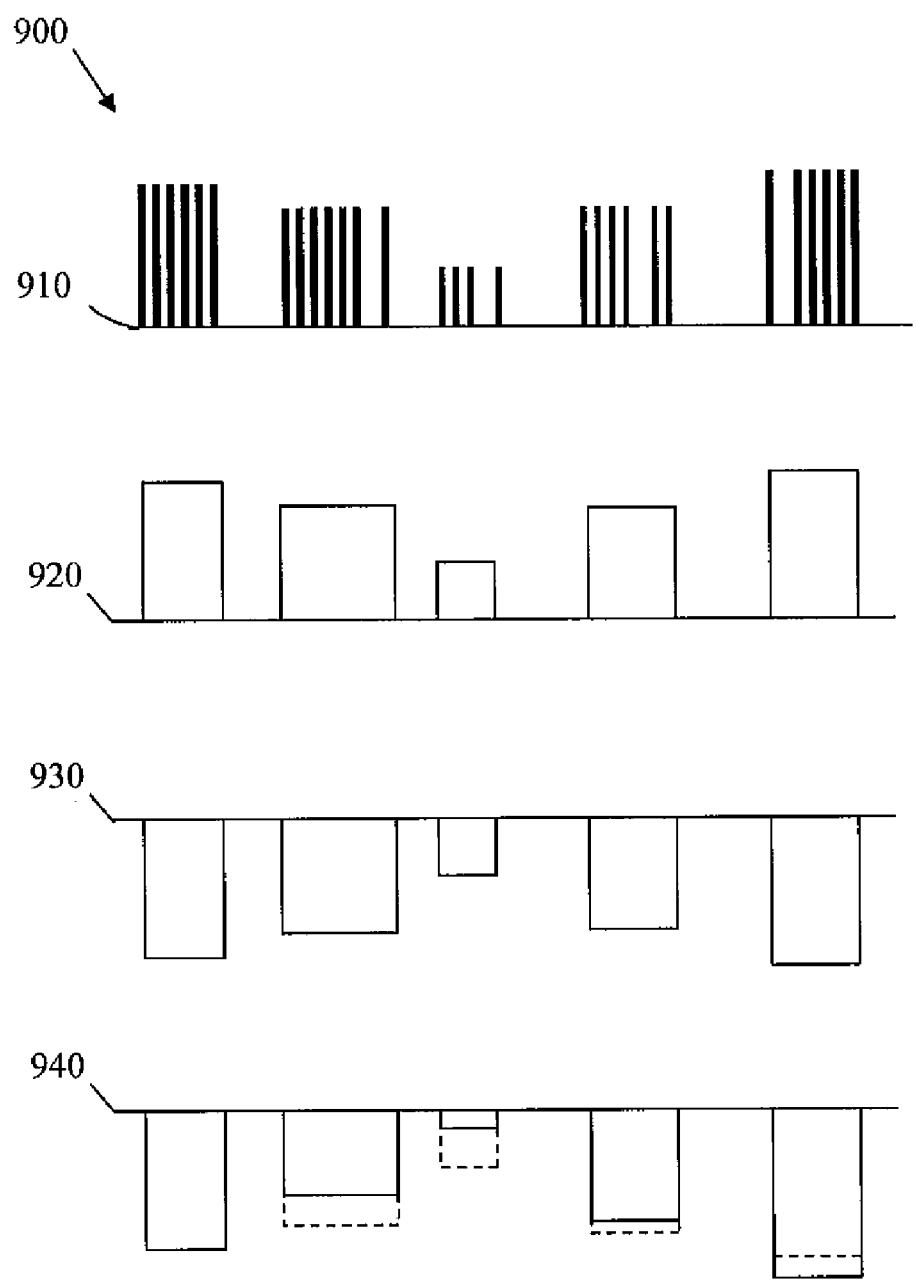
FIG. 9 is a schematic diagram of an embodiment of adaptive injection current controlled optical burst signals.

FIG. 8 illustrates one embodiment of an AIC controlled optical burst mode method 800. The method 800 may be implemented at the AIC controlled OA 200 to obtain the injection currents based on the power of optical burst signals and use the injection currents to amplify the optical signals. FIG. 9 illustrates a schematic diagram of converted and amplified signals 900 using the method 800. The signals 900 may comprise optical burst signals 910, voltage signals 920, inverted voltage signals 930, and adjusted voltage signals 940.

Returning to FIG. 8, at block 810 the method 800 may split the optical burst signals into two copies comprising optical burst signals similar to the original signals. The first copy may have a larger power level than the second copy. At block 820, the method 800 may delay the transmission of the first copy of optical burst signals. At block 830, the method 800 may convert the optical burst signals in the second copy to electrical voltage signals. In FIG. 9, the optical burst signals 910 may represent the second copy of optical burst signals, while the voltage signals 920 may represent the converted electrical voltage signals.

At block 840 of FIG. 8, the method 800 may further split the electrical voltage signals into two copies that may be similar. At block 850, the method 800 may calculate an amplitude correction value for each voltage signal in the first copy, which may be about equal to the difference between the amplitude of each voltage signal and the average amplitude in all voltage signals times a constant which is determined by experiment. At block 860, the method may invert the amplitudes of the voltage signals in the second copy by introducing a phase shift angle, which may be equal to 180°, to each signal. At block 870, the method 800 may adjust the voltage signals' amplitudes by adding the amplitude correction values (may be positive or negative) to the absolute amplitudes of the corresponding inverted voltage signals. In FIG. 9, the inverted voltage signals 930 and the adjusted voltage signals 940 may represent the inverted signals and the adjusted signals, respectively, in the second copy.

At block 880 of FIG. 8, the method 800 may convert the adjusted voltage signals into injection current signals that may have proportional amplitudes to those in the adjusted voltage signals. At block 890, the method 800 may amplify the delayed optical burst signals in the first copy proportionally to the amplitudes of the corresponding injection currents signals. Thus, each optical burst signal may be amplified proportionally to a different current signal amplitude, such that the optical burst signals with higher power levels may be amplified by smaller amounts than those with lower power levels. Furthermore, the amount of amplification determined by the correction value may result in amplifying each optical burst signal to about the average power in all the optical burst signals. Consequently, the power levels in the amplified optical burst signals may be about equal and the DC offset variations may be reduced in the optical receiver.

In another embodiment, the method 800 may adjust the amplitudes of the voltage signals at block 870 before inverting the voltage amplitudes at block 860. The method 800 may also implement blocks 860 and 870 simultaneously by introducing an appropriate phase shift angle to each voltage signal. The method 800 may amplify optical signals that may not be transmitted continuously without interruptions or pauses and may not comprise optical burst signals.

Figure 10:
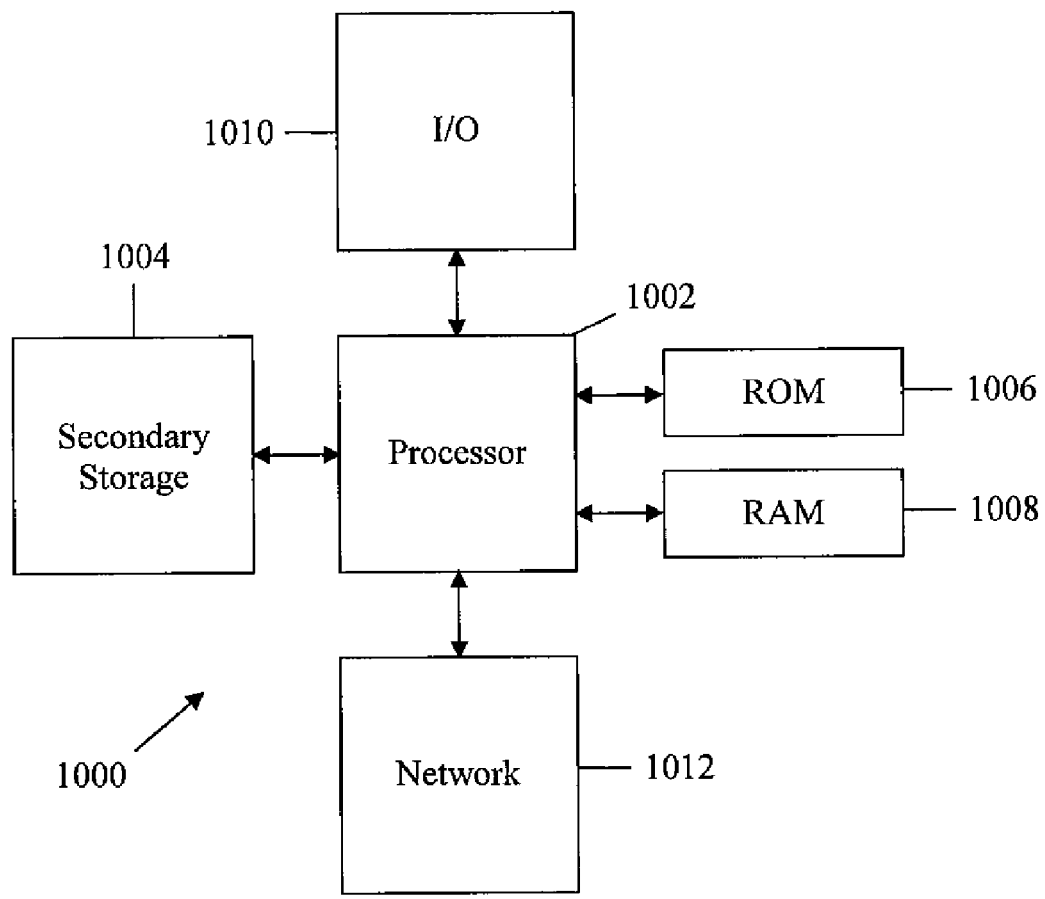
FIG. 10 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 10 illustrates a typical, general-purpose network component suitable for implementing one or more embodiments of a node disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor may be implemented as one or more CPU chips, or may be part of one or more application specific integrated circuits (ASICs).

The secondary storage 1004 is typically comprised of one or more disk drives or tape drives and is used for non-volatile storage of data and as an over-flow data storage device if RAM 408 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   an optical power splitter;
   an optical delay line coupled to the optical power splitter;
   an optical amplifier (OA) coupled to the optical delay line; and
   an adaptive injection current (AIC) controller coupled to the optical power splitter and the OA,
   wherein the AIC controller comprises:
      an optical detector coupled to the optical power splitter;
      an adaptive amplitude controller coupled to the optical detector;
      a phase shifter coupled to the optical detector and the adaptive amplitude controller; and
      a voltage-to-current converter coupled to the phase shifter and the OA.

2. The apparatus of claim 1, wherein the optical detector is a positive intrinsic negative (PIN) diode.

3. The apparatus of claim 1, further comprising:
   a wavelength division multiplexer (WDM) coupled to the optical power splitter;
   a second OA coupled to the WDM; and
   a second WDM coupled to the OA and the second OA.

4. The apparatus of claim 1, further comprising:
   an optical receiver coupled to the OA;
   a wavelength division multiplexer (WDM) coupled to the optical power splitter; and
   an optical transmitter coupled to the WDM.

5. The apparatus of claim 4, further comprising:
   a second OA located between the WDM and the optical transmitter; and
   an optical attenuator located between the second OA and the optical transmitter.

6. The apparatus of claim 1, wherein the OA has a tunable wavelength range from about 1200 nanometers (nm) to about 1600 nm.

7. An apparatus comprising:
   an optical line terminal (OLT) comprising:
      an optical receiver; and
      an adaptive injection current (AIC) controlled optical amplifier (OA) coupled to the optical receiver, the AIC controlled OA comprising:
         an adaptive amplitude controller;
         a phase shifter coupled the adaptive amplitude controller;
         an optical detector coupled to the adaptive amplitude controller and the phase shifter; and
         a voltage-to-current converter coupled to the phase shifter and an OA,
      wherein the AIC controlled OA provides optical power equalization for any upstream optical signals,
   wherein the OLT is configured to communicate with more than 128 optical network units (ONUs), and
   wherein the optical receiver is configured to receive an upstream signal of about 10 Gigabits-per-second (Gbps) from at least some of the ONUs.

8. The apparatus of claim 7, wherein the OLT is configured to couple to a plurality of ONUs via an optical distribution network (ODN), and wherein the optical receiver is configured to receive an upstream signal of about 10 Gbps from all of the ONUs.

9. The apparatus of claim 7, further comprising:
   an optical transmitter; and
   an OA coupled to the optical transmitter.

10. The apparatus of claim 8, wherein the ODN comprises an OA and a second AIC controlled OA.

11. The apparatus of claim 7, wherein the distance between the OLT and at least some of the ONUs is at least about 60 kilometers.

12. The apparatus of claim 7, wherein the OLT communicates with about 256 ONUs via the ODN.

* * * * *